Patented Dec. 31, 1946

2,413,498

UNITED STATES PATENT OFFICE 2,413,498

MOLDING PROCESS

Julian W. Hill, Wilmington, Del., assignor to E. I. du Pont de Nemours & Company, Wilmington, Del., a corporation of Delaware No Drawing. Application March 6, 1944, Serial No. 525,307

4 Claims. (Cl. 18—55)

This invention relates to the manufacture of shaped products from polymeric materials and more particularly to a process for obtaining shaped articles from polytetrafluoroethylene.

Polytetrafluoroethylene is described in U. S. Patent 2,230,654 as a white or brown powder or jelly which becomes incandescent in the presence of a flame but which does not burn when the flame is removed and melts only at red heat. This patent also states that by the use of sufficiently high pressure and temperature the polymer can be molded into articles which are relatively clear and colorless. However, methods generally used for shaping thermoplastics, such as injection molding and extrusion, have been impractical or uneconomical on a manufacturing scale because of the peculiar characteristics of polytetrafluoroethylene.

Polytetrafluoroethylene undergoes a reversible transition at 327° C. Above this temperature the polymer is transparent in thin sections, is markedly less crystalline as shown by X-ray diagrams, and has a very low tensile strength. On cooling below 327° C. the polymer becomes translucent or opaque, becomes more crystalline, and regains its tensile strength. However, above 327° C., and even at temperatures as high as 450° C., the polymer assumes none of the ordinary properties of a liquid or fluid.

This invention has as an object a new and practical method for forming articles from tetrafluoroethylene polymer. Other objects will appear hereinafter.

In the best method of practicing the invention the desired article is formed by shaping a mixture of comminuted polytetrafluoroethylene and a heat-decomposable film-forming material, and then removing the film-forming material at a temperature sufficiently high to flash off said film-forming material and continuing the heating until the polytetrafluoroethylene coalesces as more fully described hereinafter. By "flash off" is meant the burning, volatilizing or degrading to volatile products.

The invention is illustrated by the following example in which parts are by weight.

One part of comminuted polytetrafluoroethylene is stirred into four parts of commercial collodion (a solution of nitrocellulose in a highly volatile solvent mixture). The resulting viscous slurry or suspension is cast on a glass plate and the solvent permitted to evaporate. The plate containing the cured, polytetrafluoroethylene-filled nitrocellulose film is next passed into an oven maintained at 430–450° C. The nitrocellulose flashes off almost immediately leaving a grayish film of polytetrafluoroethylene. Heat treatment is continued for about 10 minutes or until the residue is rendered clear and transparent. Film and support are then passed quickly into cold water. A translucent, coherent, tough, flexible film of polytetrafluoroethylene approximately 0.005" thick results.

The polytetrafluoroethylene in the above example can be replaced by the co-polymerization product of tetrafluoroethylene in major amount, preferably above 75%, with other polymerizable materials examples of which are ethylene, isobutylene, chlorotrifluoroethylene, vinylidene chloride, vinylidene fluoride, vinyl fluoride, vinyl chloride, etc. Film-forming materials other than that mentioned in the example comprise cellulose acetate, ethyl cellulose, and other cellulose ethers and esters, polyvinyl acetate, polyesters obtained from polyhydric alcohols and polybasic acids, polystyrene, and protein fiber-forming materials such as gelatin and zein. The most valuable products, however, are those obtained from nitrocellulose and polytetrafluoroethylene.

The ratio of the tetrafluoroethylene polymer and the volatile or combustible film-forming material will vary depending upon the properties desired. Thus, when high proportions of the film-forming material are used in the preparation of films, thin films are generally obtained. Since the film-forming material is destroyed in the processing steps, it is usually desirable to use as small quantities as possible and still maintain sufficient rigidity to facilitate handling of the initial shaped object. In most instances the combined weight of the tetrafluoroethylene polymer and film-forming material will consist of from 10% to 75% of the latter.

The time and temperature of heating of the shaped object will be dependent upon the type of film-forming material used and the nature of the tetrafluoroethylene polymer. In general the temperature of heating will be above the melting or transition point of the tetrafluoroethylene polymer. Thus, in compositions containing polytetrafluoroethylene, the temperature of heating will usually be between 350 and 500° C.

The heating step is preferably carried out in the presence of oxygen supplied by the atmosphere, from a tank, or by oxygen-liberating materials such as inorganic nitrates, e. g., ammonium nitrate.

This invention provides an improved and economical method for obtaining shaped polytetrafluoroethylene articles such as rods, tubes, and unsupported films. Films, fibers, and massive objects can be advantageously used as electrical insulation. The fibers and films can be wrapped onto the article to be insulated. These wrappings can be set by heat treatment to eliminate their tendency to unwrap. This heat setting treatment, particularly of oriented fibers and films, results in an increase in the flexible life, i. e., the resistance to heat embrittlement, of the fibers and films. The process disclosed herein can also be used to coat porous materials, such as asbestos sheets and fibers, carbon, mica, bentonite, glass, and metal wires with the polymer.

As many widely different embodiments of this invention may be made without departing from the spirit and scope thereof, it is to be understood that this invention is not to be limited to the specific embodiments thereof except as defined in the appended claims.

I claim:

1. A process for obtaining shaped articles from tetrafluoroethylene polymer which comprises mixing the polymer with another organic film-forming material which decomposes at a temperature of from 350° C. to 500° C., said organic film-forming material being present in an amount of from 10% to 75% of the combined weight of said tetrafluoroethylene polymer and said organic film-forming material, forming the mixture thus obtained into the shape of the desired article, heating the shaped mixture to a temperature of from 350° C. to 500° C. and continuing said heating until said polymer coalesces.

2. A process for obtaining shaped articles from polytetrafluoroethylene which comprises mixing the polymer with nitrocellulose in the proportion of from 10% to 75% of the nitrocellulose on the basis of the combined weight of said polymer and nitrocellulose, forming the mixture thus obtained into the shape of the desired article, heating the shaped mixture to a temperature of from 350° C. to 500° C., and continuing said heating until said polymer coalesces.

3. The process set forth in claim 1 in which said organic film-forming material is a cellulose ether.

4. The process set forth in claim 1 in which said organic film-forming material is a cellulose ester.

JULIAN W. HILL.